US008150156B2

(12) United States Patent
Geva et al.

(10) Patent No.: US 8,150,156 B2
(45) Date of Patent: Apr. 3, 2012

(54) AUTOMATED PROCESSING OF PAPER FORMS USING REMOTELY-STORED TEMPLATES

(75) Inventors: Amir Geva, Yokne'am Ilit (IL); Ehud Karnin, Koranit (IL); Eugeniusz Walach, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 851 days.

(21) Appl. No.: 11/325,039

(22) Filed: Jan. 4, 2006

(65) Prior Publication Data

US 2007/0154098 A1    Jul. 5, 2007

(51) Int. Cl.
*G06K 9/34* (2006.01)

(52) U.S. Cl. ........ 382/175; 382/176; 382/321; 715/224; 715/505; 715/526

(58) Field of Classification Search ........... 382/175, 382/209, 190, 176, 321; 715/224, 505, 526
See application file for complete search history.

(56) References Cited

U.S. PATENT DOCUMENTS

| | | | | |
|---|---|---|---|---|
| 5,060,980 | A * | 10/1991 | Johnson et al. | 283/70 |
| 5,317,646 | A * | 5/1994 | Sang, Jr. et al. | 382/175 |
| 5,444,779 | A * | 8/1995 | Daniele | 399/366 |
| 5,754,308 | A * | 5/1998 | Lopresti et al. | 358/403 |
| 5,943,137 | A * | 8/1999 | Larson et al. | 358/403 |
| 6,141,659 | A * | 10/2000 | Barker et al. | 1/1 |
| 7,289,685 | B1 * | 10/2007 | Wolff et al. | 382/317 |
| 7,296,221 | B1 * | 11/2007 | Treibach-Heck et al. | 715/224 |
| 7,411,690 | B2 * | 8/2008 | Tsukada | 358/1.15 |
| 7,426,486 | B2 * | 9/2008 | Treibach-Heck et al. | 705/32 |
| 7,542,160 | B2 * | 6/2009 | Parry et al. | 358/1.15 |
| 2002/0063892 | A1 * | 5/2002 | Tsukada | 358/1.15 |
| 2002/0083154 | A1 * | 6/2002 | Auffray et al. | 709/218 |
| 2002/0146170 | A1 * | 10/2002 | Rom | 382/175 |
| 2002/0198884 | A1 * | 12/2002 | Eisinger | 707/10 |
| 2003/0009710 | A1 * | 1/2003 | Grant | 714/37 |
| 2003/0023626 | A1 * | 1/2003 | Bretti | 707/506 |
| 2003/0122791 | A1 * | 7/2003 | Breiner | 345/173 |
| 2004/0077347 | A1 * | 4/2004 | Lauber et al. | 455/428 |
| 2004/0158740 | A1 * | 8/2004 | Lien et al. | 713/200 |
| 2004/0223197 | A1 | 11/2004 | Ohta et al. | |
| 2004/0237040 | A1 * | 11/2004 | Malkin et al. | 715/526 |
| 2006/0077444 | A1 * | 4/2006 | Lum et al. | 358/1.15 |

FOREIGN PATENT DOCUMENTS

EP          0459793       *  4/1991
EP          459793 A1     * 12/1991

OTHER PUBLICATIONS

IBM Intelligent Forms Processing, details available at: http://www2.clearlake.ibm.com/GOV/ifp/.
The Adobe XML architecture, details at: http://www.adobe.com/enterprise/xml.html.

* cited by examiner

*Primary Examiner* — Samir Ahmed
*Assistant Examiner* — Mek Bekele

(57) ABSTRACT

A computer-implemented method for processing paper forms includes accepting a filled-in paper form conforming to a template at a computer system having a local memory, wherein the template is not stored in the local memory. Identification information is extracted from the filled-in paper form using the computer system. The identification information indicates a network address of a remote storage location external to the computer system, in which the template is stored. The template is retrieved responsively to the identification information by communication with the remote storage location via a wide area network (WAN). The filled-in paper form is processed responsively to the retrieved template.

14 Claims, 2 Drawing Sheets

AUTOMATED PROCESSING OF PAPER FORMS USING REMOTELY-STORED TEMPLATES

FIELD OF THE INVENTION

The present invention relates generally to form processing systems, and particularly to methods and systems for automated processing of paper forms having an unknown structure using remotely-stored templates.

BACKGROUND OF THE INVENTION

Many types of organizations use forms to acquire data from clients, so as to provide services and run their business. Such organizations typically run computerized databases and other computerized systems for storing and otherwise processing the information conveyed in the forms. Typically, such systems process large numbers of forms and convert them into computer-readable information.

Some applications use paper forms that are filled in and submitted by clients. For example, IBM Corp. (Armonk, N.Y.) offers an Intelligent Forms Processing (IFP) system, which automates data capture from large numbers of paper forms. Additional details regarding the IFP system are available at www2.clearlake.ibm.com/GOV/ifp/.

SUMMARY OF THE INVENTION

There is therefore provided, in accordance with an embodiment of the present invention, a computer-implemented method for processing paper forms. The method includes accepting a filled-in paper form conforming to a template at a computer system having a local memory, wherein the template is not stored in the local memory. Identification information is extracted from the filled-in paper form using the computer system. The identification information indicates a network address of a remote storage location external to the computer system, in which the template is stored. The template is retrieved responsively to the identification information by communication with the remote storage location via a wide area network (WAN). The filled-in paper form is processed responsively to the retrieved template.

In an embodiment, the computer system is associated with a first organization, and the remote storage location is associated with a second organization different from the first organization.

In another embodiment, extracting the identification information includes at least one of decoding a graphically-encoded image printed on the filled-in form and recognizing textual information using an optical character recognition (OCR) process. The graphically-encoded image may include a barcode image encoding the identification information.

In yet another embodiment, extracting the identification information includes extracting an identifier identifying the template, in addition to the network address, and retrieving the template includes selecting the template in the remote storage location using the identifier from among a plurality of templates stored at the remote storage location.

In still another embodiment, the template includes template information and part of the template information is embedded in the filled-in form. In this embodiment, extracting the identification information includes extracting the part of the template information from the filled-in form in addition to retrieving the template from the remote storage location.

In an embodiment, extracting the identification information includes determining the network address of the remote storage location by identifying in the filled-in form information related to an originator of the template.

There is also provided, in accordance with an embodiment of the present invention, another computer-implemented method for processing paper forms conforming to a template. The method includes encoding template information including at least one of geometrical information related to fields of the template and content-related information related to expected contents of the fields of the template in a computer-readable symbol printed on the paper forms. A filled-in paper form conforming to the template is accepted. The computer-readable symbol is decoded from the filled-in paper form to extract the template information. The filled-in paper form is processed responsively to the extracted template information.

In accordance with another embodiment of the present invention, there is provided a computer-readable form. The form includes a page upon which a template is printed and upon which a computer-readable symbol is printed encoding template information comprising at least one of geometrical information related to fields of the template and content-related information related to expected contents of the fields of the template, so as to enable a computer, upon receiving an image of the paper form, to extract the template information from the symbol and to reconstruct the template using the template information.

There is also provided, in accordance with an embodiment of the present invention, an apparatus for processing paper forms. The apparatus includes an input device, which is arranged to accept a filled-in paper form conforming to a template. The apparatus further includes a network interface, which is arranged to communicate with a wide area network (WAN), and a processor, which is arranged to extract identification information from the filled-in paper form. The identification information indicating a network address of a remote storage location external to the apparatus, in which the template is stored, to retrieve the template responsively to the identification information by communicating with the remote storage location via the WAN using the network interface, and to process the filled-in paper form responsively to the retrieved template.

In accordance with another embodiment of the present invention, there is provided a system for processing paper forms. The system includes one or more remote servers, which are arranged to store form templates, and a form processor, which is arranged to accept a filled-in paper form conforming to a template not locally-stored in the form processor, to extract identification information from the filled-in paper form. The identification information indicating a network address of a chosen server out of the one or more remote servers in which the template is stored, to retrieve the template responsively to the identification information by communicating with the chosen server via a wide area network (WAN), and to process the filled-in paper form responsively to the retrieved template.

The present invention will be more fully understood from the following detailed description of the embodiments thereof, taken together with the drawings in which:

DETAILED DESCRIPTION OF EMBODIMENTS

Overview

Known methods and systems for automated processing of paper forms typically assume that the structure, or template, of the processed forms is locally-available at the form processing system when the form is submitted. In these known methods and systems, the template is either stored a-priori in a local memory of the system or provided along with each submitted form. In some applications, however, the template of the form being processed in not locally-available to the system at the time the form is submitted.

Embodiments of the present invention provide methods and systems for processing paper forms whose templates are stored in a remote storage location, externally to the form processing system. Such a remote location may comprise, for example, a web-site of the form originator. Information identifying the template is embedded in the form. The identification information typically indicates a network address of the remote storage location in which the corresponding template can be found. When a filled-in paper form is submitted for processing, the system extracts the identification information and then retrieves the remotely-stored template for use in processing the filled-in form.

Unlike known methods and systems in which the template is stored locally, the methods and systems described herein enable processing of paper forms originating from different sources and conforming to a wide variety of templates, some of which may vary over time. Furthermore, the use of remotely-stored templates offers significant operational flexibilities to both form originators and recipients, as will be shown below.

System Description

Figure 1:
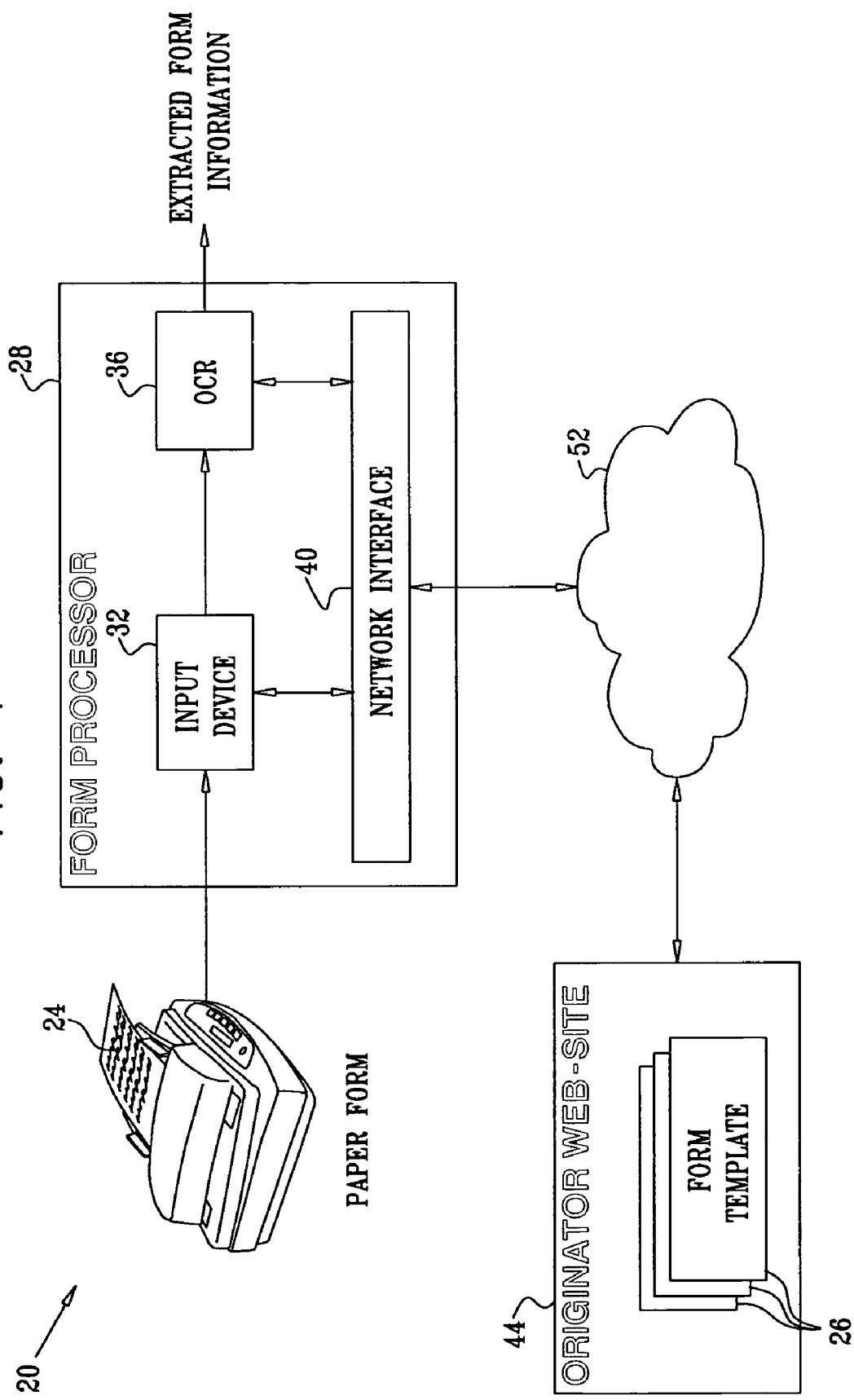
FIG. 1 is a block diagram that schematically illustrates a system for paper form processing, in accordance with an embodiment of the present invention.

FIG. 1 is a block diagram that schematically illustrates a system 20 for paper form processing, in accordance with an embodiment of the present invention. System 20 accepts filled-in paper forms 24 of different formats, which may be hand-filled and/or typed. The system extracts the information conveyed in the forms, information which can then be stored in a database, displayed to a user, provided to another application or system, or used in any other way.

Each paper form conforms to a respective, predefined template 26. The template comprises template information, which typically defines both layout-related properties and content-related properties of the form. The template information may comprise, for example, names of fields of the form, and the location coordinates and size of the fields. Additionally or alternatively, template information may comprise expected character types, formats or ranges in each field, e.g., numerical or alphanumeric characters, single digits, integer numbers or date formats.

In some embodiments, the template information comprises validity rules related to the information filled in the fields of the form. For example, in an invoice form, a validity rule may state that the entry filled in the TOTAL field should be equal to the entry filled in the SUBTOTAL field plus an 8% state tax. As will be shown below, the template information is often used by the form processing system in order to increase the efficiency and accuracy of the form acquisition.

In some applications, form templates may be stored and maintained at a remote location not directly associated with the form processing system, rather than storing the templates locally. For example, system 20 may comprise an invoice-processing application, in which an organization acquires goods or services from multiple suppliers. The suppliers submit paper invoices to the organization, which processes the invoices in order to settle its payments. The organization uses form processing system 20 for processing the invoices it receives.

In the exemplary invoice processing application, each supplier may use a different invoice template. The organization may receive a wide variety of different invoice formats from multiple suppliers. Some suppliers may use more than one invoice template. Some suppliers may be first-time suppliers, from which invoices were not received in the past. Invoice templates may also be modified without any coordination with the receiving organization.

It can be appreciated that in such an application, it is difficult for a form processing system to keep local track of a wide variety of dynamic templates originating from different sources. Furthermore, in some situations it is desirable to use invoice templates of a particular supplier in several form processing systems. As will be shown below, these difficulties can be overcome by using remotely-stored templates. Additional benefits and operational flexibilities associated with using remotely-stored templates are described further below.

The invoice processing application described above was chosen as an exemplary application, in order to demonstrate the need for processing paper forms using remotely-stored templates. The methods and systems described herein can be used in any other suitable form processing application, such as processing of hand-filled lottery forms, credit card slips, hotel receipts and earning statements, etc.

Training a form processing system to recognize and use a large number of possibly-varying form templates is often impractical. Some known methods attempt to automatically identify the fields of the form without the assistance of a template. Such methods are described, for example, in U.S. Pat. Nos. 6,886,136 and 6,640,009 and in U.S. Patent Application Publication 2002/0111961. These methods, however, are often slow, costly and error-prone. The methods and systems described below use a different approach of retrieving a form template stored in a remote storage location external to the form processing system, such as in a web-site of the form originator or of a third party.

System 20 comprises a form processor 28, which performs the functions associated with accepting and processing the filled-in paper forms. Form processor 28 comprises an input device 32, which captures the filled-in paper forms and converts them to form images having a suitable computer-recognizable graphical format. In some embodiments, device 32 comprises a document scanner or a fax machine. In other embodiments, the filled-in paper form is already submitted to system 20 in graphical electronic format. In such embodiments, device 32 comprises a suitable input interface for accepting the graphical image. System 20 may comprise several different input devices 32 to enable the system to accept forms in different ways.

The form images produced by input device 32 are processed by an optical character recognition (OCR) module 36, which extracts the information filled in each form and converts it to recognized text. OCR module 36 may apply any suitable OCR process known in the art for this purpose. In some embodiments, the OCR process uses the template information during the recognition process. In many cases, the template information enables the OCR module to increase the accuracy and speed of the recognition process. For example, the template information may direct the OCR module to search for text only in certain areas of the form, thus speeding the conversion process. As another example, when the template information defines expected character types, value ranges and/or validity rules, this information enables detecting conversion errors so as to increase the recognition accuracy.

In some embodiments, template 26 of a particular form is stored in a remote storage location external to form processor 28, such as in a web-site 44 of the form originator. The template information stored in web-site 44 may comprise, for example, descriptions of the form fields, for example using extensible markup language (XML) definitions. Such descriptions typically define the data type (e.g., numerical, alphanumeric or Boolean) and allowed value range in each field. The template information may comprise the location coordinates of each field on the form. The template information may also comprise the names of all fields, in the exact format in which they are printed on the form, so as to simplify their recognition by the OCR module. Additionally or alternatively, the template information may comprise a high quality scanned image of a sample form, as well as an electronic representation (e.g., vector representation) of the sample form. Further additionally or alternatively, the template information may comprise a list of validity rules, as described above.

Form processor 28 comprises a network interface 40. When a filled-in paper form is submitted for processing, processor 28 communicates via interface 40 with web-site 44 in order to retrieve the template 26 corresponding to the submitted form. Processor 28 and web-site 44 typically communicate over a wide-area network (WAN) 52, such as the Internet.

Typically, processor 28 comprises a general-purpose computer, which is programmed in software to carry out the functions described herein. The software may be downloaded to the computer in electronic form, over a network, for example, or it may alternatively be supplied to the computer on tangible media, such as CD-ROM. Further alternatively, some elements of processor 28 may be implemented using hardware or using a combination of hardware and software elements.

In general, system 20 may comprise any number of originator web-sites 44 and other remote storage locations. Each web-site 44 may hold a number of templates 26, each template corresponding to a particular type of form issued by the originator.

In some embodiments, web-site 44 may be operated by a third party or by a standardization body. Such web-sites may hold templates of several originators, as well as standard templates used by more than one originator. For example, a third party organization may offer a service in which templates of different form types are posted on the organization web-site. Subscribers to this service will be granted access to these remotely-stored templates.

In comparison with methods and systems that use locally-stored templates, maintaining remotely-stored form templates enables significant operational flexibilities to the originators, as well as to the receiving organization. Processor 28 can process a wide variety of different form types, some of which may change over time, without prior training.

Modification of paper forms and associated templates can be performed by the originator at any time, without prior coordination with the receiving organization. As a result, templates can be easily kept up-to-date. The form originator may in some cases modify the template information without modifying paper forms already in circulation.

Furthermore, the use of remotely-stored templates can be introduced in a gradual manner, such as by providing and/or using only part of the template information. In some embodiments, a particular remotely-stored template can be retrieved and used by multiple form processing systems.

In some embodiments, the use of remotely-stored templates provides a measure of verification, authentication and/or control over the paper forms already in circulation. For example, if a particular form type becomes obsolete, the corresponding template may be removed, or an indication of the obsolescence added to the template information. When a filled-in obsolete form is submitted to system 20, processor 28 will be informed that the form is obsolete when trying to retrieve its template. Such verification method can be used, for example, for identifying and rejecting forged checks.

Form Processing Method Description

Figure 2:
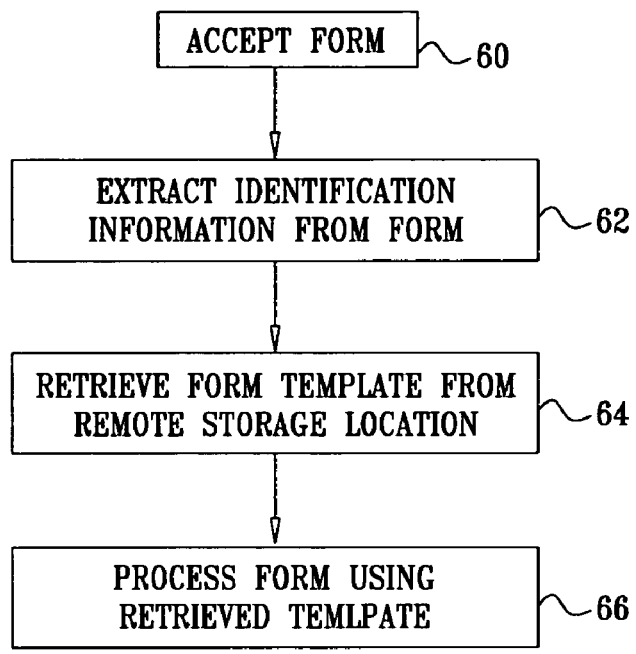
FIG. 2 is a flow chart that schematically illustrates a method for paper form processing, in accordance with an embodiment of the present invention.

FIG. 2 is a flow chart that schematically illustrates a method for paper form processing, in accordance with an embodiment of the present invention. The method begins with form processor 28 accepting a filled-in paper form 24, at a form submission step 60. Input device 32 converts the paper form into a form image and provides the image to OCR module 36. At this stage, processor 28 has no prior information regarding the identity of the form originator or the template associated with the form.

Processor 28 analyzes the filled-in form and extracts identification information from the form, at an identification extraction step 62. The identification information typically specifies a network address of the remote storage location in which the form template can be found. For example, the identification information may specify the address in the form of a uniform resource locator (URL) or Internet protocol (IP) address of the originator web-site 44 or other server in which the relevant template is stored, or in any other suitable form known in the art.

Alternatively, when the identification information does not specify such an address, processor 28 may be able to determine the remote storage location by recognizing information related to the form originator, such as the company name, logo, telephone and/or fax number printed on the form. Based on this identity, the processor may be able to determine the network address of the remote storage location of the template. Additionally, the identification information typically comprises a template identifier or code that identifies the specific form template.

Figure 3A:
FIGS. 3A and 3B are barcode images used for paper form processing, in accordance with an embodiment of the present invention.
Figure 3B:
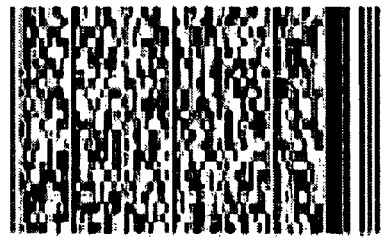

In some embodiments, the identification information is encoded in a mutually-agreed graphical encoding format printed on the form, such as a barcode. (Exemplary one-dimensional and two-dimensional barcode images are shown in FIGS. 3A and 3B below.) The barcode can be printed in a convenient location on the form, in some cases on the back of the form. Other known encoding methods, such as half-tone encoding or magnetic ink character recognition (MICR), can also be used for this purpose.

Alternatively, the identification information can be printed as textual information on the form using agreed, commonly-used terms that will enable the OCR module to easily identify this information. For example, a line containing text such as URL:www.originatorname.com, FORM_ID:76543 can be printed at the top of the form. OCR module 36 can extract the appropriate URL and template identifier from the text line. In general, the identification information can be extracted either by the OCR module (such as when using barcode or textual information) or by the input device (such as when using MICR).

Processor 28 now uses the extracted identification information to retrieve the template corresponding to the submitted form, at a template retrieval step 64. Processor 28 communicates with the appropriate web-site 44, according to the address indicated by the identification information. Processor 28 retrieves from this web-site the template identified by the template identifier specified in the identification information.

Processor 28 then processes the submitted form using the retrieved template, at a form processing step 66. Typically, OCR module 36 uses the template information to identify field coordinates. At these coordinates, the OCR module recognizes the textual entries of the filled-in form and converts them into recognized text. The recognized text is then verified against the character types, value ranges and/or validity rules specified in the retrieved template. Additionally or alternatively, processor 28 may apply any other suitable processing functions to the submitted form.

In some embodiments, processor 28 may choose to use only part of the template information.

In some cases, only part of the template information is remotely-stored in web-site 44. Other parts of the template information may be known a-priori to processor 28, or may have to be identified from the form itself. Partial use and/or storage of template information may be desirable to enable gradual introduction of remotely-stored templates, in parallel to other form processing methods. In some embodiments, when only part of the template information is stored at the remote location, other parts of the template information can be encoded and printed on the form, such as using a barcode.

In some embodiments, the entire template information is encoded in a computer-readable symbol printed on the form. The computer-readable symbol may comprise, for example, a two-dimensional bar-code. In these embodiments, processor 28 decodes the computer-readable symbol to extract the template information, without retrieving any remotely-stored information. The symbol may be printed in any convenient location on the front or back of the form. The template information may comprise the template identifier.

FIGS. 3A and 3B are barcode images used for form processing, in accordance with an embodiment of the present invention. FIG. 3A shows an exemplary one-dimensional barcode image 70. Such one-dimensional encoding is able to convey approximately 15 bytes of information, and is therefore mainly used for encoding numerical indices.

FIG. 3B shows an exemplary two-dimensional barcode image 74, in accordance with the well-known PDF417 standard. Such a two-dimensional barcode, approximately one square inch in size, can encode up to 2710 characters or bytes of information. A two-dimensional barcode can be used in conjunction with the method of FIG. 2 above, for example, when it is desirable to remotely-store only part of the template information, and embed another part of the template information in the form itself.

For example, the following text shows a template definition that can be encoded in a two-dimensional barcode image such as image 74:

TaxYear N 100, 50, 300, 100
BB N 108, 243, 216, 335
BC_EADDRESS C 96, 459, 305, 513
BC_ECITY A 108, 616, 383, 678
BC_ENAME A 96, 784, 228, 882
BC_ESTATE A 102, 997, 398, 1054
BC_EZIP N 96, 1157, 293, 1238
BD N 106, 1361, 210, 1447
W2_3RDPARTY_FLAG B 94, 1579, 273, 1645
W2_FED_WH N 105, 1794, 380, 1878
W2_MEDICARE_WAGES N 106, 2013, 404, 2092
W2_MEDICARE_WH N 103, 2230, 251, 2324
W2_PENSIONPLAN_FLAG B 96, 2470, 243, 2536
W2_SS_WAGES N 90, 2670, 206, 2728
W2_SS_WH N 104, 2835, 211, 2924
W2_STATUTORY_FLAG B 102, 3026, 300, 3098
W2_WAGES N 98, 3200, 300, 3289

In the text above, each row defines a particular field in the form. The first column specifies the field name. The second entry in each row specifies the field type, wherein N denotes a numerical field, A denotes an alphanumeric field and B denotes a Boolean field or flag. The remaining four entries specify the location of the field in the form by giving the coordinates (in millimeters) of the two diagonal corners of the field. For example, the field denoted TaxYear is a numerical field located in the rectangle defined by corner coordinates (100, 50) and (300, 100) on the paper form.

Although the embodiments described herein mainly address the processing of paper forms by retrieving remotely-stored templates, the methods and systems described herein can be used to process other types of paper documents and objects that conform to templates.

The methods and systems described herein can also be used to translate electronically-represented forms (E-forms) from one format or standard to another. The translation may be performed using a remotely-stored translation template or using remotely stored templates of the source and destination E-forms.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A computer-implemented method for processing paper forms, comprising:

at a computer system having a local memory, accepting a paper form, which is hand-filled with data by a user and is structured in accordance with a template associated with a form originator, wherein the template is not stored in the local memory;

extracting from the hand-filled paper form using the computer system a company name, a logo or a telephone number of the form originator;

deducing from the extracted company name, logo or telephone number a network address of a remote storage location external to the computer system, in which the template is stored;

retrieving the template from the network address by communication with the remote storage location via a wide area network (WAN); and using the retrieved template, extracting the data that was hand-filled by the user into the paper form.

2. The method according to claim 1, wherein the computer system is associated with a first organization, and wherein the remote storage location is associated with a second organization different from the first organization.

3. The method according to claim 1, wherein extracting the company name, logo or telephone number comprises at least one of decoding a graphically-encoded image printed on the filled-in form and recognizing textual information using an optical character recognition (OCR) process.

4. The method according to claim 3, wherein the graphically-encoded image comprises a barcode image encoding the identification information.

5. The method according to claim 1, and comprising extracting from the hand-filled paper form an identifier identifying the template, in addition to the network address, wherein retrieving the template comprises selecting the template in the remote storage location using the identifier from among a plurality of templates stored at the remote storage location.

6. The method according to claim 1, wherein the template comprises template information, wherein part of the template information is embedded in the filled-in form, and comprising extracting the part of the template information from the filled-in form in addition to retrieving the template from the remote storage location.

7. Apparatus for processing paper forms, comprising:
- an input device, which is arranged to accept a paper form, which is hand-filled with data by a user and is structured in accordance with a template associated with a form originator;
- a network interface, which is arranged to communicate with a wide area network (WAN); and
- a processor, which is arranged to extract from the hand-filled paper form a company name, a logo or a telephone number of the form originator, to deduce from the extracted company name, logo or telephone number a network address of a remote storage location external to the apparatus, in which the template is stored, to retrieve the template from the network address by communicating with the remote storage location via the WAN using the network interface, and to extract, using the retrieved template, the data that was hand-filled by the user into the paper form.

8. The apparatus according to claim 7, wherein the apparatus is associated with a first organization, and wherein the remote storage location is associated with a second organization different from the first organization.

9. The apparatus according to claim 7, wherein the processor is arranged to extract the company name, logo or telephone number by performing at least one of decoding a graphically-encoded image printed on the filled-in form and recognizing textual information using an optical character recognition (OCR) process.

10. The apparatus according to claim 9, wherein the graphically-encoded image comprises a barcode image encoding the identification information.

11. The apparatus according to claim 7, wherein the processor is arranged to extract an identifier identifying the template, in addition to the network address, and to retrieve the template by selecting the template in the remote storage location using the identifier from among a plurality of templates stored at the remote storage location.

12. The apparatus according to claim 7, wherein the template comprises template information, wherein part of the template information is embedded in the filled-in form, and wherein the processor is arranged to extract the part of the template information from the filled-in form in addition to retrieving the template from the remote storage location.

13. A system for processing paper forms, comprising:
- one or more remote servers, which are arranged to store form templates; and
- a form processor, which is arranged to accept a paper form, which is hand-filled with data by a user and is structured in accordance with a template that is associated with a form originator and is not locally-stored in the form processor, to extract from the hand-filled paper form a company name, a logo or a telephone number of the form originator, to deduce from the extracted company name, logo or telephone number a network address of a chosen server out of the one or more remote servers in which the template is stored, to retrieve the template from the network address by communicating with the chosen server via a wide area network (WAN), and to extract, using the retrieved template, the data that was hand-filled by the user into the paper form.

14. The system according to claim 13, wherein the form processor is associated with a first organization, and wherein the chosen server is associated with a second organization different from the first organization.

* * * * *